(12) United States Patent
Kimura

(10) Patent No.: US 11,645,796 B2
(45) Date of Patent: May 9, 2023

(54) INFORMATION PROCESSING APPARATUS, DISPLAY CONTROL METHOD, STORAGE MEDIUM, SUBSTRATE PROCESSING APPARATUS, AND MANUFACTURING METHOD OF ARTICLE

(71) Applicant: CANON KABUSHIKI KAISHA, Tokyo (JP)

(72) Inventor: Masahiro Kimura, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/544,757

(22) Filed: Dec. 7, 2021

(65) Prior Publication Data

US 2022/0189089 A1  Jun. 16, 2022

(30) Foreign Application Priority Data

Dec. 14, 2020 (JP) .............................. JP2020-206834

(51) Int. Cl.
  *G06T 11/60* (2006.01)
  *G06F 16/25* (2019.01)
  *G06T 11/00* (2006.01)

(52) U.S. Cl.
  CPC ............ *G06T 11/60* (2013.01); *G06F 16/252* (2019.01); *G06T 11/001* (2013.01); *G06T 2200/24* (2013.01)

(58) Field of Classification Search
  CPC ....................................................... G06T 11/60
  See application file for complete search history.

(56) References Cited

U.S. PATENT DOCUMENTS

| 2006/0010416 | A1* | 1/2006 | Keck ...................... G06Q 10/06 700/121 |
| 2008/0259302 | A1 | 10/2008 | Kojima |
| 2018/0267512 | A1* | 9/2018 | Yamamoto ......... G05B 19/4155 |

FOREIGN PATENT DOCUMENTS

JP        2002373836 A    12/2002

\* cited by examiner

*Primary Examiner* — Shivang I Patel
(74) *Attorney, Agent, or Firm* — Canon U.S.A., Inc. IP Division

(57) ABSTRACT

An information processing apparatus configured to control display on a user interface includes an acquisition unit configured to acquire recipe data regarding a processing condition of a substrate processing apparatus configured to process a substrate and layout data regarding a layout of a processed portion of the substrate processed by the substrate processing apparatus, and a display control unit configured to perform control to display, on the user interface, information regarding the layout data and information regarding the recipe data related to the layout data, the layout data and the recipe data being acquired by the acquisition unit, in association with each other.

13 Claims, 9 Drawing Sheets

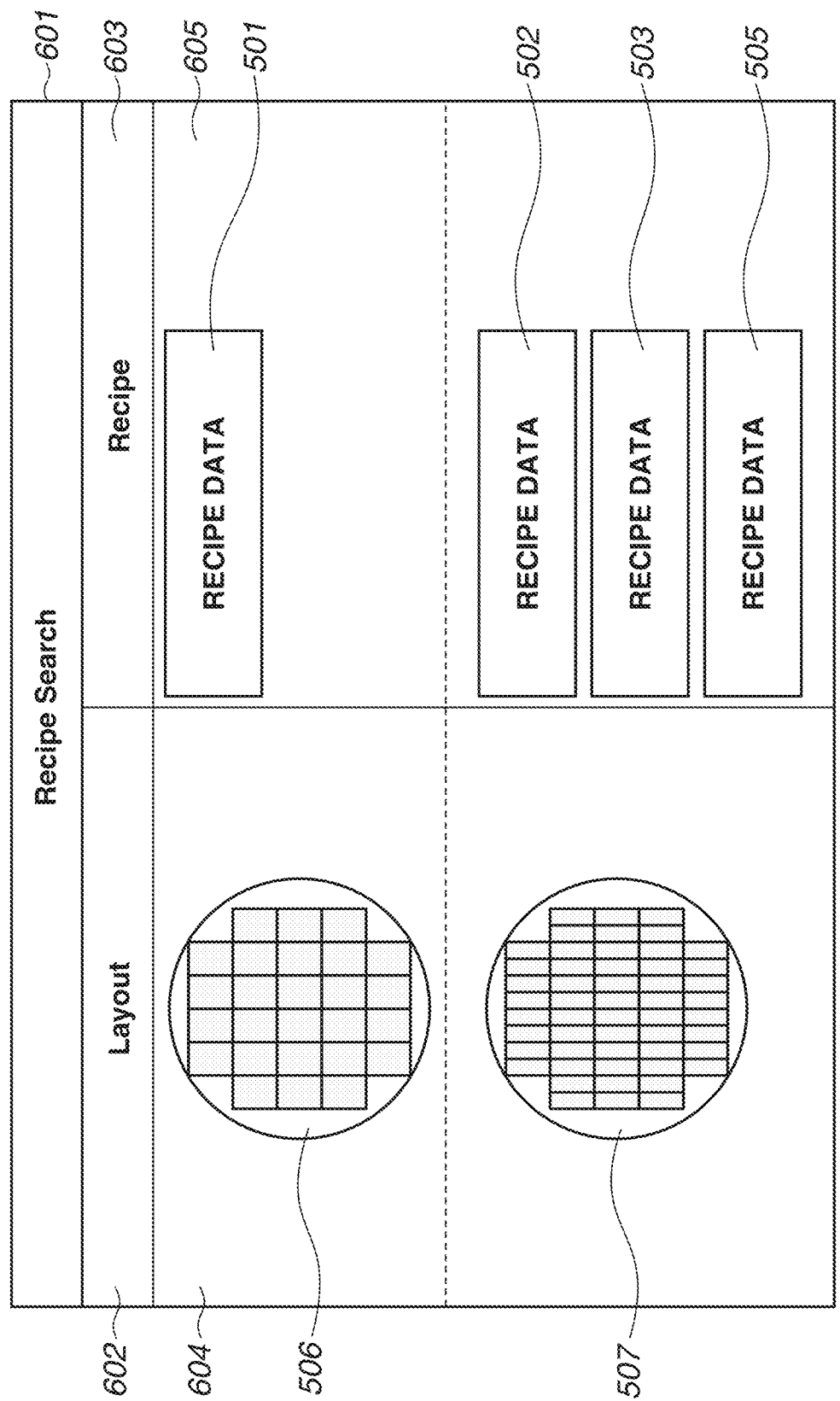

INFORMATION PROCESSING APPARATUS, DISPLAY CONTROL METHOD, STORAGE MEDIUM, SUBSTRATE PROCESSING APPARATUS, AND MANUFACTURING METHOD OF ARTICLE

BACKGROUND

Field of the Disclosure

The present disclosure relates to an information processing apparatus, a display control method, a storage medium, a substrate processing apparatus, and a manufacturing method of an article.

Description of the Related Art

In a substrate processing apparatus that processes a substrate for manufacturing an article such as a semiconductor device, recipe data regarding a processing condition for processing the substrate needs to be prepared for each type of an article to be manufactured. The recipe data includes a plurality of pieces of data, such as layout data regarding a layout of a processed portion of the substrate processed by the substrate processing apparatus, and control data regarding control of each unit of the substrate processing apparatus. The recipe data is different for each type of an article to be manufactured from the substrate. Even in a case of an identical article type, the recipe data is also different depending on manufacturing steps and substrate processing apparatuses. In an information processing apparatus that manages the recipe data, an operator can display the recipe data on a screen and edit a plurality of pieces of data constituting the recipe data.

Japanese Patent Application Laid-Open No. 2002-373836 discusses a technique of displaying a plurality of pieces of data constituting recipe data side by side on a screen, and issuing a command to input held data in a state where the screen is being displayed.

With an increase in performance of a substrate processing apparatus and diversification of an article such as a semiconductor device, the number of pieces of data constituting recipe data increases. For this reason, there is a case where an operator duplicates existing recipe data and edits part of the data to generate new recipe data in order to reduce generation time, when the operator generates recipe data.

However, as the number of pieces of recipe data stored in the information processing apparatus increases, the operator takes a lot of time in searching existing recipe data and finding intended recipe data.

SUMMARY

The present disclosure relates to a technique of providing an information processing apparatus capable of searching for recipe data in a shorter period of time, a display control method, a storage medium, a substrate processing apparatus, and a manufacturing method of an article.

An information processing apparatus configured to control display on a user interface includes an acquisition unit configured to acquire recipe data regarding a processing condition of a substrate processing apparatus configured to process a substrate and layout data regarding a layout of a processed portion of the substrate processed by the substrate processing apparatus, and a display control unit configured to perform control to display, on the user interface, information regarding the layout data and information regarding the recipe data related to the layout data, the layout data and the recipe data being acquired by the acquisition unit, in association with each other.

Further features of the present invention will become apparent from the following description of exemplary embodiments with reference to the attached drawings.

BRIEF DESCRIPTION OF THE DRAWINGS

FIG. 6 is a diagram illustrating a search screen for searching for recipe data according to a first exemplary embodiment.

DESCRIPTION OF THE EMBODIMENTS

Figure 1:
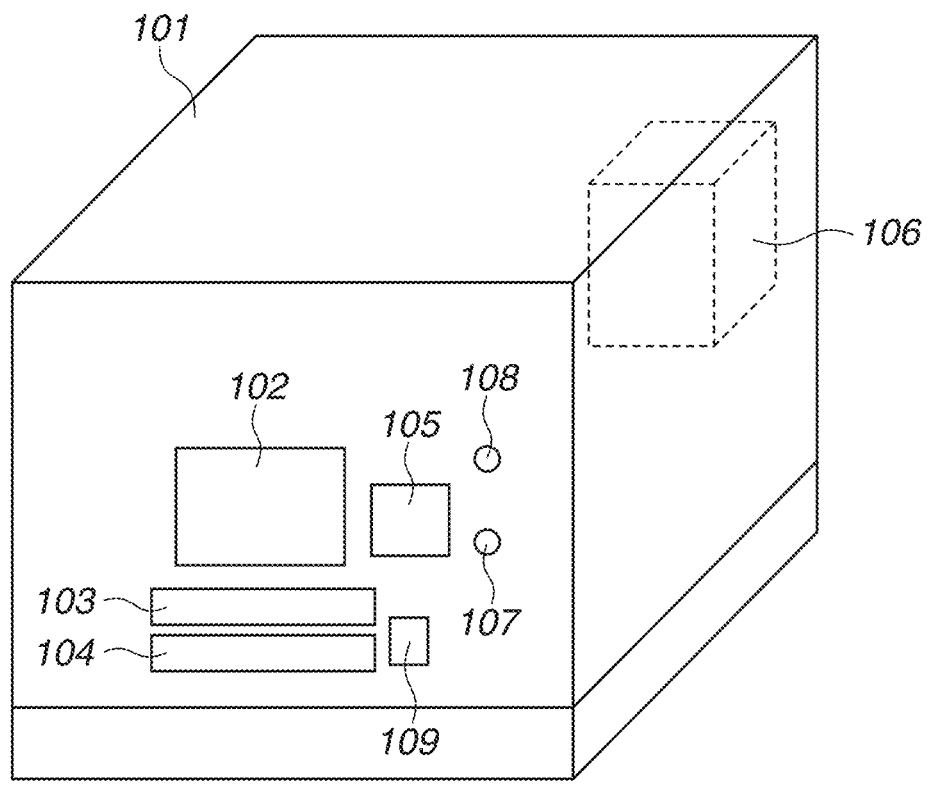
FIG. 1 is a perspective view illustrating an outer appearance of an exposure apparatus.

Preferred exemplary embodiments of the present disclosure will be described in detail with reference to the accompanying drawings. In the drawings, the same member is denoted by the same reference sign and an overlapping description is omitted.

In a first exemplary embodiment, a description will be provided using an exposure apparatus as an example of a substrate processing apparatus. FIG. 1 is a perspective view illustrating an outer appearance of the exposure apparatus. As illustrated in FIG. 1, the exposure apparatus includes a chamber 101 and a control unit 106. The chamber 101 controls an environmental temperature of an apparatus main body. The control unit 106 includes a central processing unit (CPU) configured to control the apparatus main body. The exposure apparatus includes a console unit which includes a display 102, a monitor 105, an operation panel 103, and a keyboard 104. The display 102 displays various kinds of information. The monitor 105 displays image information obtained via an imaging unit in the apparatus main body. The operation panel 103 is used by an operator to make an input. FIG. 1 illustrates an ON/OFF switch 107, an emergency stop switch 108, and a device 109 such as a switch of various types and a mouse. The main body of the exposure apparatus is arranged inside of the chamber 101.

The display 102 is a thin flat type display, such as an organic electroluminescence (EL) display, a plasma display, and a liquid crystal display. The display 102 is stored in a front side of the chamber 101, and is connected to the control unit 106 via a local area network (LAN) cable. The control unit 106 is an information processing apparatus, and will be described in detail below. The operation panel 103, the keyboard 104, the monitor 105, and the like are arranged on the front side of the chamber 101, and operations can be performed with the console unit from the front side of the chamber 101.

Figure 2:
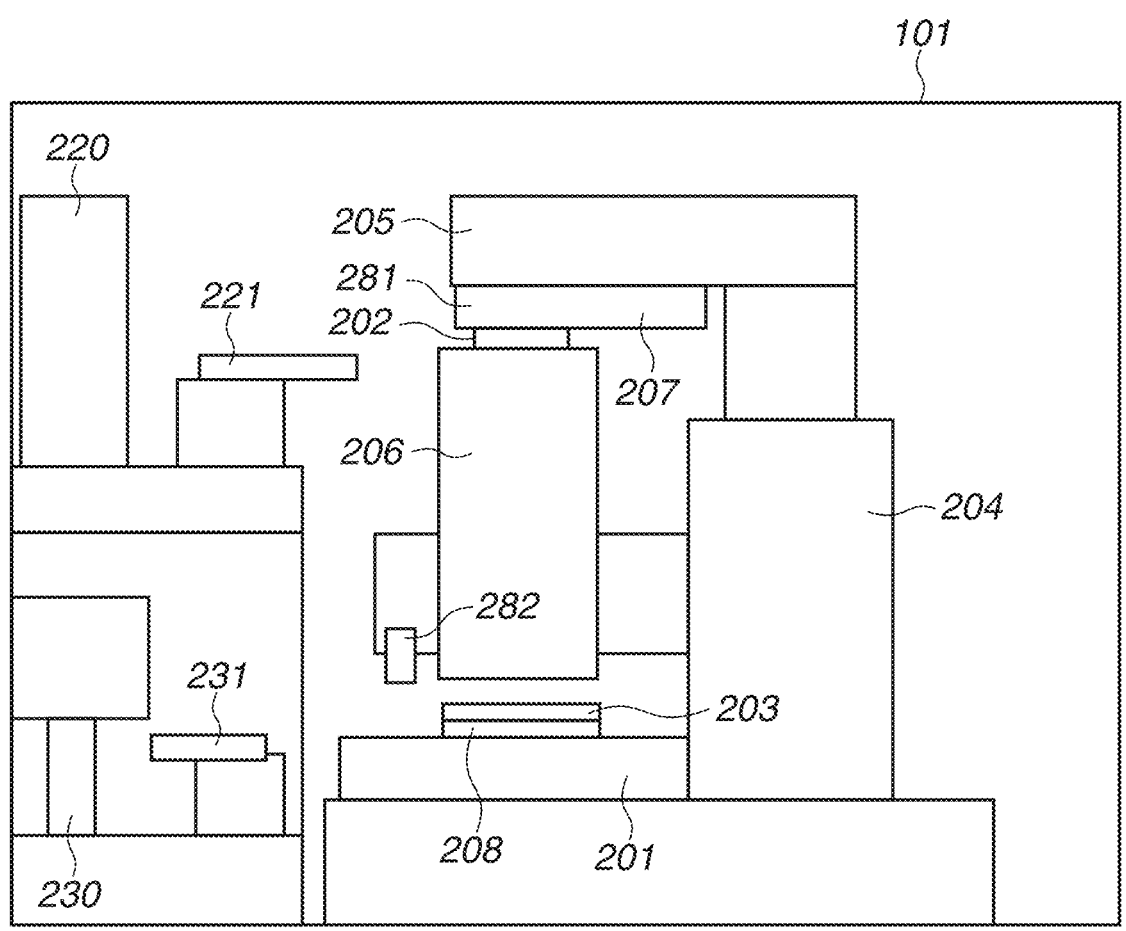
FIG. 2 is a diagram illustrating an internal configuration of the exposure apparatus.

FIG. 2 is a diagram illustrating an internal configuration of the exposure apparatus. FIG. 2 illustrates a stepper as the exposure apparatus. FIG. 2 illustrates a reticle (original plate, mask) 202 and a wafer (substrate) 203. When the reticle 202 is irradiated with a light flux emitted from a light source device 204 through an illumination optical system 205, a projection lens 206 can transfer a pattern on the reticle 202 onto a photosensitive layer on the wafer 203. The reticle 202 is supported by a reticle stage 207 for holding and moving the reticle 202. The wafer 203 is exposed to light in a state where the wafer 203 is being vacuum-suctioned by a wafer chuck 208. The wafer chuck 208 is movable in each axis direction by a wafer stage 201. A reticle optical system 281 for detecting an amount of positional deviation of the reticle 202 is arranged on the upper side of the reticle 202. An off-axis microscope 282 is arranged to be adjacent to the projection lens 206 on the upper side of the wafer stage 201. A main role of the off-axis microscope 282 is to detect a relative position of an internal reference mark and an alignment mark on the wafer 203. A reticle library 220 and an elevator 230, which are peripheral devices, are arranged to be adjacent to a stepper main body, and a necessary reticle and a necessary wafer are transported to the stepper main body by a reticle transport device 221 and a wafer transport device 231, respectively, to the stepper main body.

Figure 3:
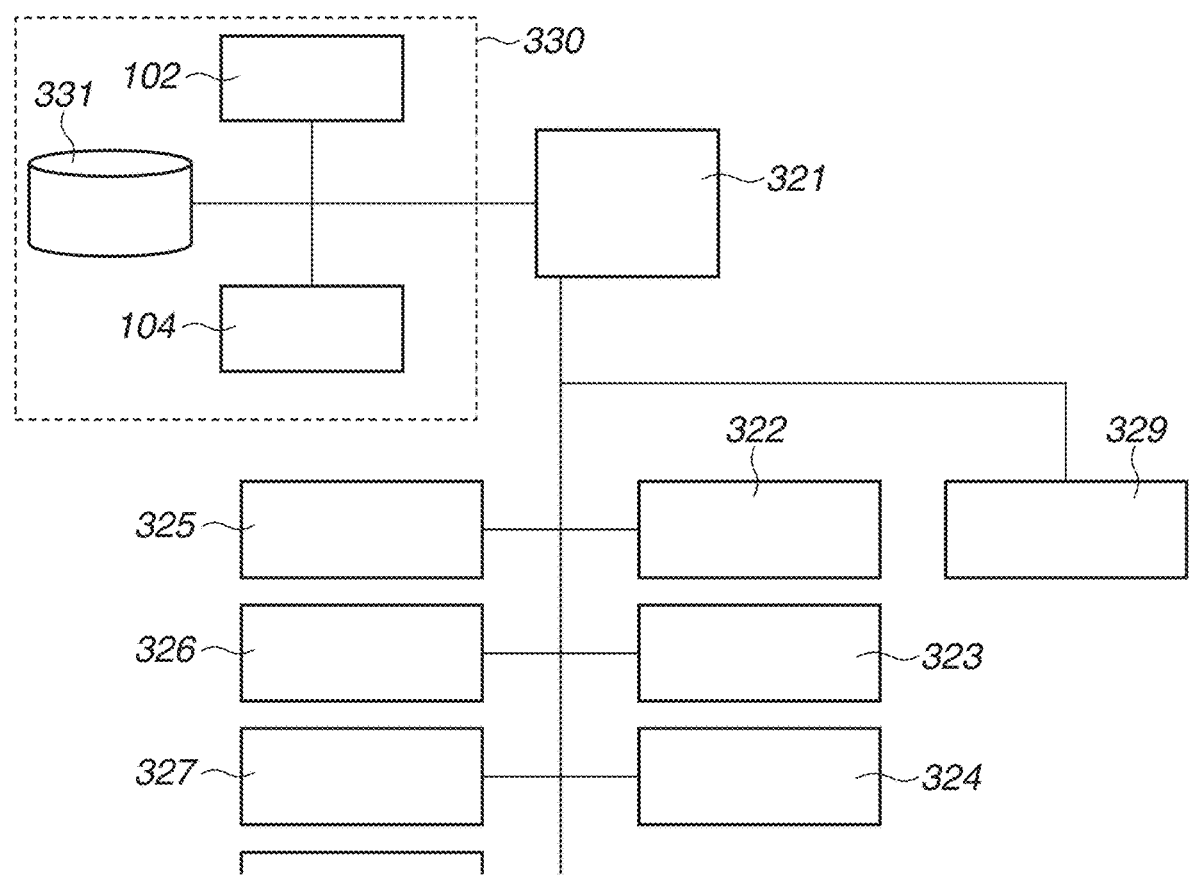
FIG. 3 is a block diagram illustrating an electric circuit configuration of the exposure apparatus.

FIG. 3 is a block diagram illustrating an electric circuit configuration of the control unit 106 configured to control the exposure apparatus. FIG. 3 illustrates a CPU 321 configured to control the whole of the exposure apparatus, and the CPU 321 is built into the control unit 106. FIG. 3 also illustrates a wafer stage driving device 322, an alignment detection system 323 such as the off-axis microscope 282, a reticle stage driving device 324, an illumination system 325 such as the light source device 204, a shutter driving device 326, a focus detection system 327, and a Z driving device 328. These elements are controlled by the CPU 321. A transport system 329 is a transport system for the reticle transport device 221, the wafer transport device 231, and the like.

A console unit 330 includes the display 102, the keyboard 104, a mouse (not illustrated), and a touch pen (not illustrated), and is a unit for issuing various kinds of commands and parameters regarding operations of the exposure apparatus to the CPU 321. In other words, the console unit 330 is a unit for giving and receiving information to/from an operator, and plays a role as a user interface of the exposure apparatus. An external memory 331 stores recipe data, layout data, and the like.

The recipe data includes information indicating processing conditions for performing exposure processing, such as data related to a reticle to be used, an opening amount of a masking blade, an exposure dose, focus-related data, and layout data. The exposure apparatus performs the exposure processing in accordance with the information indicating the processing conditions for performing the exposure processing included in the recipe data. The control unit 106 plays a role as an acquisition unit configured to acquire parameters of various types of recipe data and the like from the external memory 331, and as a display control unit configured to control display of the display 102. The control unit 106 acquires the recipe data from the external memory 331, but may acquire the recipe data from an external device connected to the exposure device via a network.

Figure 4A:
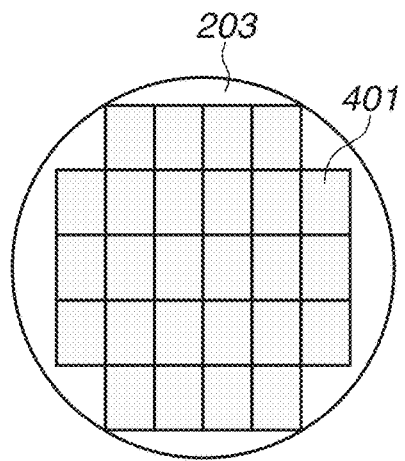
FIGS. 4A and 4B are top views of a wafer processed by the exposure apparatus.
Figure 4B:
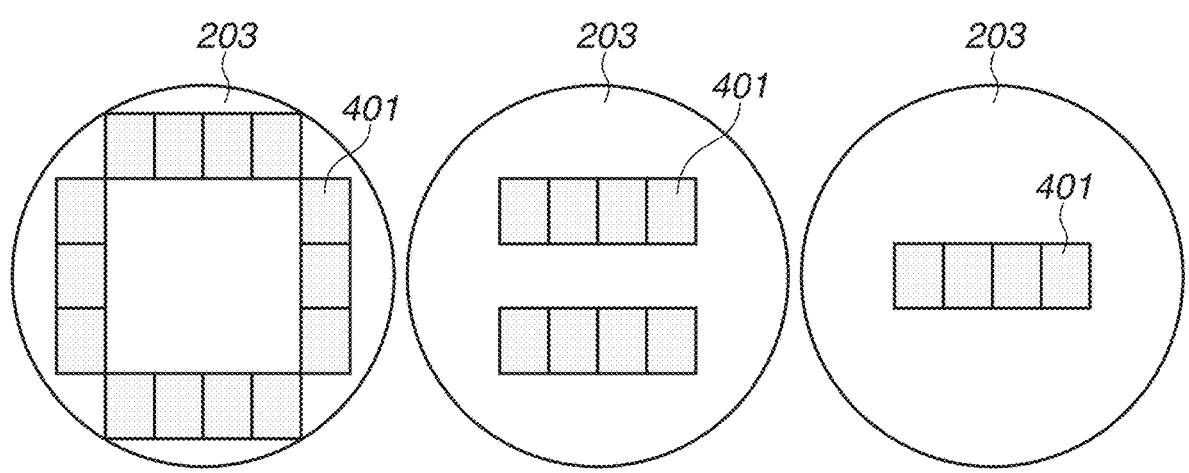

The layout data related to the recipe data is now described. FIGS. 4A and 4B are top views of the wafer 203 processed by the exposure apparatus. An exposure region 401 is a target of the exposure processing performed by the exposure apparatus. In an example illustrated in FIG. 4A, twenty-six exposure regions 401 are arranged. A plurality of exposure regions 401 is sequentially subjected to the exposure processing by the exposure apparatus. That is, the exposure regions 401 are processed portions of the wafer 203 subjected to the exposure processing, and the layout data includes information regarding a layout of the processed portions of the wafer 203 subjected to the exposure processing. Each processed portion is not limited to a region having a predetermined area like the exposure region 401. For example, a dot or a line, such as a predetermined dot in the exposure region 401 and a line indicating a boundary between the exposure regions 401, may serve as the processed portion.

The layout data includes data regarding the layout of the exposure regions subjected to the exposure processing performed by the exposure apparatus in the wafer 203. For example, the layout data includes coordinates and a size of each exposure region 401, and the number of exposure regions 401. The coordinates of the exposure region 401 may be coordinates for defining an external form of the exposure region 401, or may be coordinates of the center of the exposure region 401. The size of the exposure region 401 may be a length of a side that defines the external form of the exposure region 401, or may be an area of the exposure region 401. The number of exposure regions 401 is the number of exposure regions 401 arranged in the wafer 203.

As illustrated in FIG. 4B, in a case where the wafer 203 is subjected to the exposure processing multiple times, there is a case where the recipe data is associated with a plurality of pieces of layout data. For example, in FIG. 4B, the exposure processing is sequentially performed on the exposure regions 401 illustrated in a left drawing, the exposure regions 401 illustrated in a middle drawing, and the exposure regions 401 illustrated in a right drawing. In this case, three pieces of layout data is associated with the recipe data, and each piece of layout data includes data regarding the layout of the exposure regions 401 illustrated in the respective drawings.

Figure 5A:
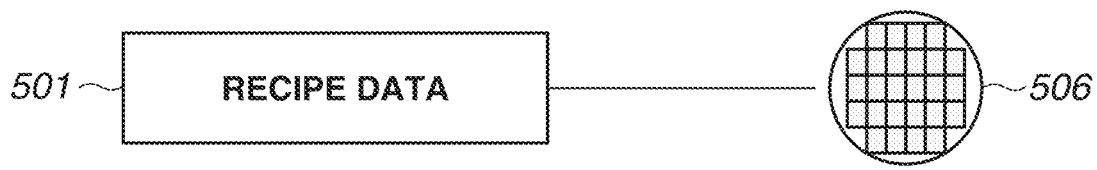
FIGS. 5A to 5C are diagrams each illustrating a relationship between recipe data and layout data.
Figure 5B:
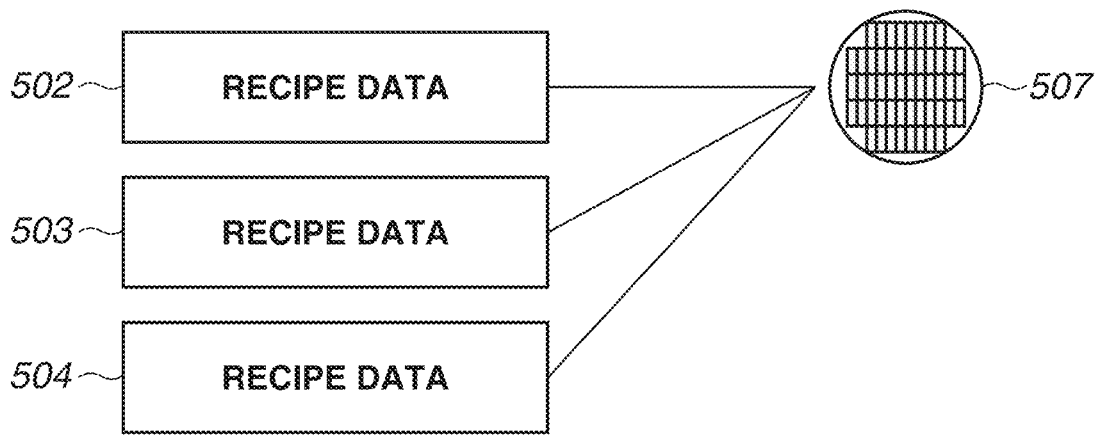
Figure 5C:
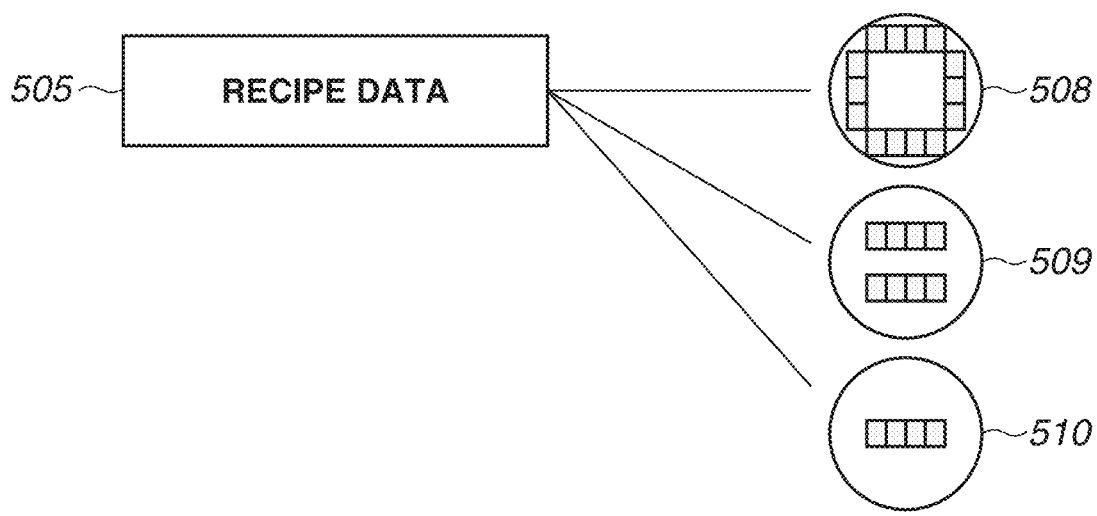

A relationship between the recipe data and the layout data is now described. FIGS. 5A to 5C are diagrams each illustrating the relationship between the recipe data and the layout data. FIG. 5A illustrates that layout data 506 is associated with recipe data 501. The layout data 506 includes the information regarding the layout of the processed portions of the wafer 203 as described above. The layout data 506 is, specifically, data regarding coordinates and a size of each exposure region 401, the number of exposure regions 401, and the like, but is illustrated as the wafer 203 and the exposure regions 401 in FIGS. 5A and 5B for the sake of clarity.

There is a case where identical layout data is associated with a plurality of pieces of recipe data.

FIG. 5B illustrates that each of recipe data 502, recipe data 503, and recipe data 504 is associated with layout data 507. Each of the recipe data 502, the recipe data 503, and the recipe data 504, having different values of at least one or more of parameters, is different recipe data, but is identical with respect to the layout of the exposure regions 401, and therefore is associated with the identical layout data 507.

There is a case where one piece of recipe data is associated with a plurality of pieces of layout data. FIG. 5C illustrates that recipe data 505 is associated with layout data 508, layout data 509, and layout data 510. In the exposure processing in accordance with the recipe data 505, the exposure processing is sequentially performed three times while the layout data is replaced, and the exposure regions indicated in each of the layout data 508, the layout data 509, and the layout data 510 are exposed in corresponding exposure processing. In this manner, the exposure processing is performed by replacing a plurality of pieces of layout data so that a complicated pattern can be formed on the wafer 203.

FIG. 6 is a diagram illustrating a search screen for searching for recipe data according to a first exemplary embodiment.

The control unit 106 controls the display 102 to display a search screen 601 including the layout data acquired from the external memory 331 or the like and the information regarding the recipe data. A label 602 indicates a region 604, in which the information regarding the layout data is displayed. In the region 604, a layout image including the exposure regions that have been imaged based on the layout data is displayed. In a case where a layout image of layout data associated with another recipe data is displayed, a boundary line with the other layout image is displayed in the region 604, and each layout image is displayed in a sectioned manner That is, the information regarding the recipe data is classified for each related layout data and displayed on the search screen 601.

A label 603 indicates a region 605, in which the recipe data is displayed. In the region 605, for example, an identifier of the recipe data or a name of the recipe data is displayed as the information regarding the recipe data. The recipe data related to the layout data of the layout image displayed in the region 604 is displayed side by side in the region 605 next to the layout image. A boundary line that sections the layout image in the region 604 is extended to the region 605, and the recipe data is classified for each related layout data and displayed.

In the example of the search screen 601 illustrated in FIG. 6, the recipe data 501 related to the layout data 506 is displayed side by side in the region 605 next to the region 604 in which the layout image indicating the layout data 506 is displayed. Each of the recipe data 502, the recipe data 503, the recipe data 505 each related to the layout data 507 is displayed side by side in a region next to a region in which the layout image indicating the layout data 507 is displayed.

With this configuration, since each of the information regarding the layout data and the information regarding the recipe data is displayed in association with each other on the search screen 601, the operator can search for the recipe data based on the information regarding the layout data.

While the two layout images are displayed on the search screen 601 illustrated in FIG. 6, the number of layout images to be displayed is not limited to two. The number of pieces of recipe data to be displayed can be a freely-selected number. In a case where the number of layout images to be displayed or the number of pieces of recipe data is too large and all of the layout images or all of the pieces of recipe data cannot be displayed on the search screen 601, the search screen 601 may have a configuration in which display of the regions 604 and 605 can be scrolled.

In the search screen 601 illustrated in FIG. 6, the layout image is displayed as the information regarding the layout data, but an identifier indicating the layout data or a name indicating the layout data may be displayed.

In the search screen 601, a line connecting the information regarding the related layout data and the information regarding the recipe data with each other may be displayed, as illustrated in FIGS. 5A and 5B. The configuration enables clear display of association between the information regarding the layout data and the information regarding the recipe data.

In the search screen 601, the information regarding the related layout data and the information regarding the recipe data may be displayed using a related color. Specifically, performing display using an identical color or similar colors for the information regarding the related layout data and the information regarding the recipe data enables display that draws a distinction from other non-related information. This configuration also enables clear display of association between the information regarding the layout data and the information regarding the recipe data.

The information processing apparatus according to the present exemplary embodiment displays the information regarding the layout data and the information regarding the recipe data in association with each other on the search screen, so that the operator can search for the recipe data in a shorter period of time.

An information processing apparatus according to a second exemplary embodiment is now described. Matters not mentioned herein can follow the description according to the first exemplary embodiment. In the second exemplary embodiment, a description is provided about display of a search screen for searching for recipe data associated with a plurality of pieces of layout data.

Figure 7:
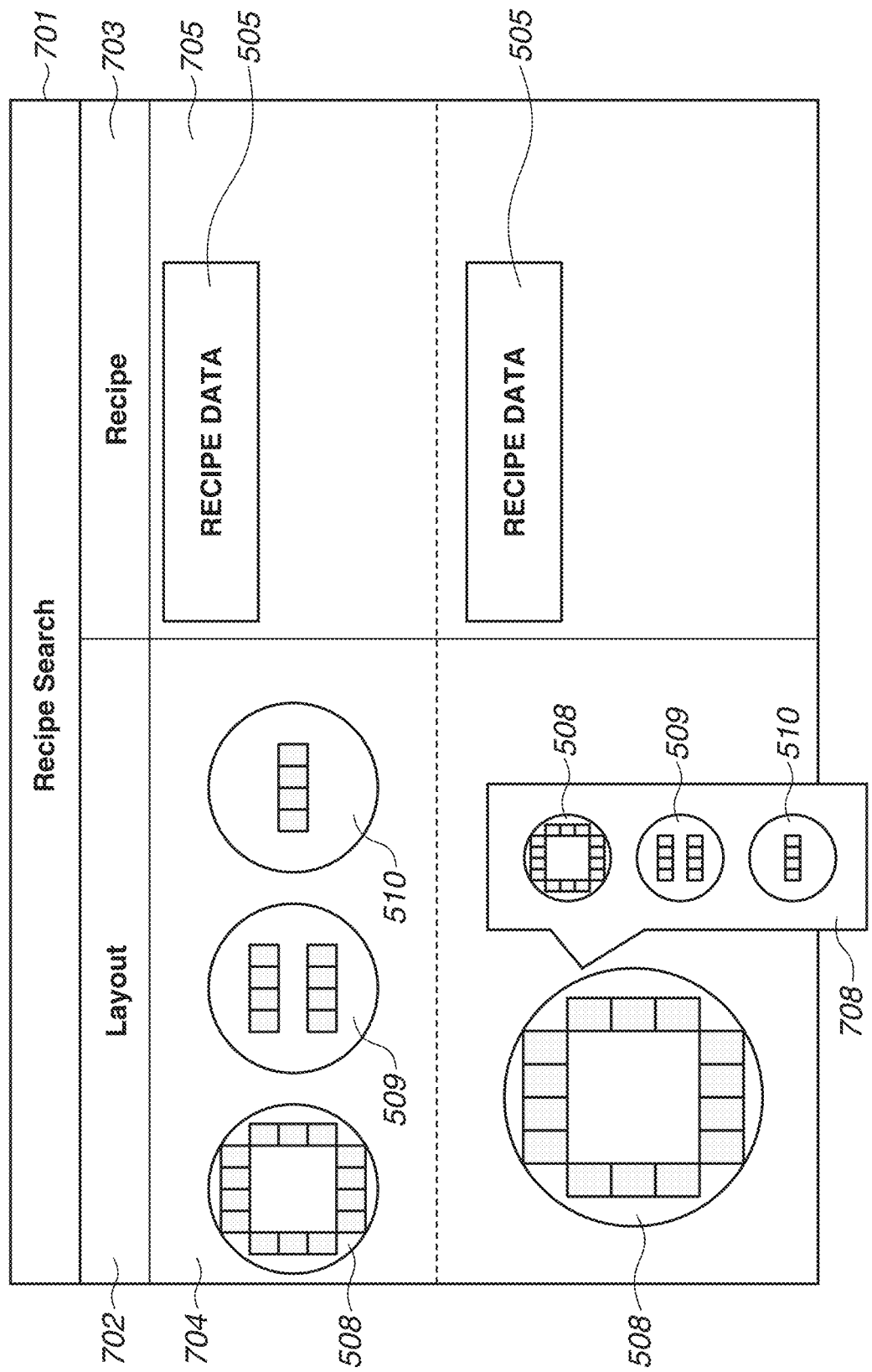
FIG. 7 is a diagram illustrating a search screen for searching for recipe data according to a second exemplary embodiment.

FIG. 7 is a diagram illustrating a search screen for searching for recipe data according to the second exemplary embodiment.

The control unit 106 controls the display 102 to display a search screen 701 including layout data acquired from the external memory 331 or the like and information regarding recipe data. A label 702 indicates a region 704, in which the layout data is displayed. In the region 704, a plurality of layout images each including exposure regions, which are imaged based on the layout data, on the wafer is displayed. The plurality of layout images is obtained by imaging the layout data associated with the identical recipe data.

In the search screen 701 illustrated in FIG. 7, different methods of displaying layout images are exemplified in upper and lower regions. In the upper region, an example of displaying a plurality of layout images side by side in a lateral direction is illustrated. The plurality of layout images is displayed side by side in the lateral direction so that the operator can simultaneously check the plurality of layout images.

In the lower region of the search screen 701, on the other hand, one or more of the plurality of layout images (one layout image in the example in FIG. 7) are displayed. In a case where an instruction is given from the operator with an input unit such as a keyboard and a mouse, a region 708, in which the layout images on the search screen 701 are scaled down to be displayed, is displayed. That is, while only one or more of the layout images are usually displayed, thumbnails of the layout images are displayed only when the instruction is given from the operator. In a case where the number of a plurality of layout images is large and all of the layout images cannot be displayed on the search screen 701, the configuration allows the layout images to be checked when needed by the operator.

The information processing apparatus according to the present exemplary embodiment displays the information regarding the plurality of pieces of layout data related to the recipe data on the search screen, so that the operator can search for the recipe data in a shorter period of time.

An information processing apparatus according to a third exemplary embodiment is now described. Matters not mentioned herein can follow the description according to the first exemplary embodiment. In the third exemplary embodiment, a description is provided about display of a search screen for searching for recipe data based on information included in recipe data.

Figure 8:
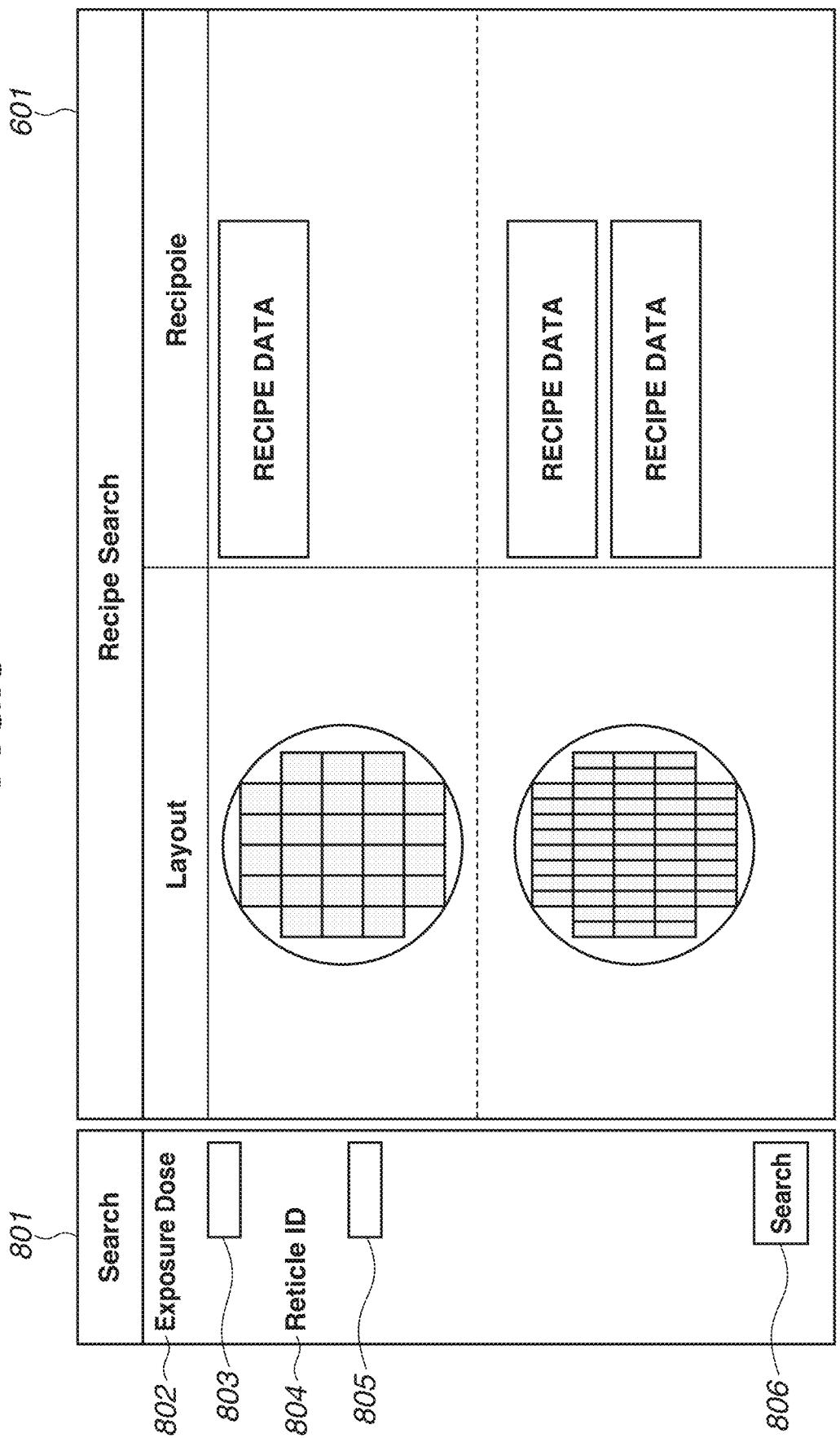
FIG. 8 is a diagram illustrating a search screen for searching for recipe data according to a third exemplary embodiment.

FIG. 8 is a diagram illustrating the search screen for searching for the recipe data according to the third exemplary embodiment.

The control unit 106 controls the display 102 to display the search screen 601 including the layout data acquired from the external memory 331 or the like and the information regarding the recipe data, and a search screen 801. Since the search screen 601 is similar to that in the first exemplary embodiment, a description thereof is omitted.

The search screen 801 is a screen for searching for the recipe data in accordance with the information regarding the recipe data. In the search screen 801, labels 802 and 804 indicate parameters included in the recipe data, and input regions 803 and 805 are regions to which values of parameters indicated in the labels 802 and 804 are input, respectively. In the example illustrated in FIG. 8, an exposure dose is displayed as the parameter indicated by the label 802 and an identifier of the reticle is displayed as the parameter indicated by the label 804, but another parameter included in the recipe data may be displayed. In the search screen 801, the information regarding the layout data, such as coordinates and a size of each exposure region 401 and the number of exposure regions 401, may be displayed.

A button 806 is a button for starting search. When the button 806 is pressed down, layout images and pieces of recipe data to be displayed on the search screen 601 are narrowed down in accordance with the respective values of the parameters input in the input regions 803 and 805. When the button 806 is pressed down, the control unit 106 searches for and acquires recipe data and layout data to which parameter values matching the respective parameter values input in the input regions 803 and 805 are set. That is, the control unit 106 acquires recipe data that satisfies a search condition, and layout data related to the recipe data. The control unit 106 performs control to display, on the search screen 601, information regarding the acquired recipe data and information regarding the acquired layout data in association with each other.

The search screen 801 illustrated in FIG. 8 is merely an example, and the number of input regions, which are displayed on the search screen 801 and to which labels indicating parameters and values of the parameters are input, can be freely determined.

The labels and the input regions may be displayed so that not only the search condition that parameter values match with each other, but also another search condition, such as a condition that designates a range of a parameter value and a condition that uses a wild card, can be input. Recipe data that satisfies one or more of a plurality of search conditions may be displayed, or recipe data that satisfies all of the plurality of search conditions may be displayed.

The information processing apparatus according to the present exemplary embodiment displays the information regarding the recipe data and the information regarding the layout data each satisfying a predetermined search condition on the search screen, so that the operator can search for the recipe data in a shorter period of time.

An information processing apparatus according to a fourth exemplary embodiment is now described. Matters not mentioned herein can follow the description according to the first exemplary embodiment. In the fourth exemplary embodiment, a description is provided about an example in which the information processing apparatus, which is arranged outside the substrate processing apparatus, performs control to display, on a search screen, information regarding recipe data and information regarding layout data in association with each other.

Figure 9:
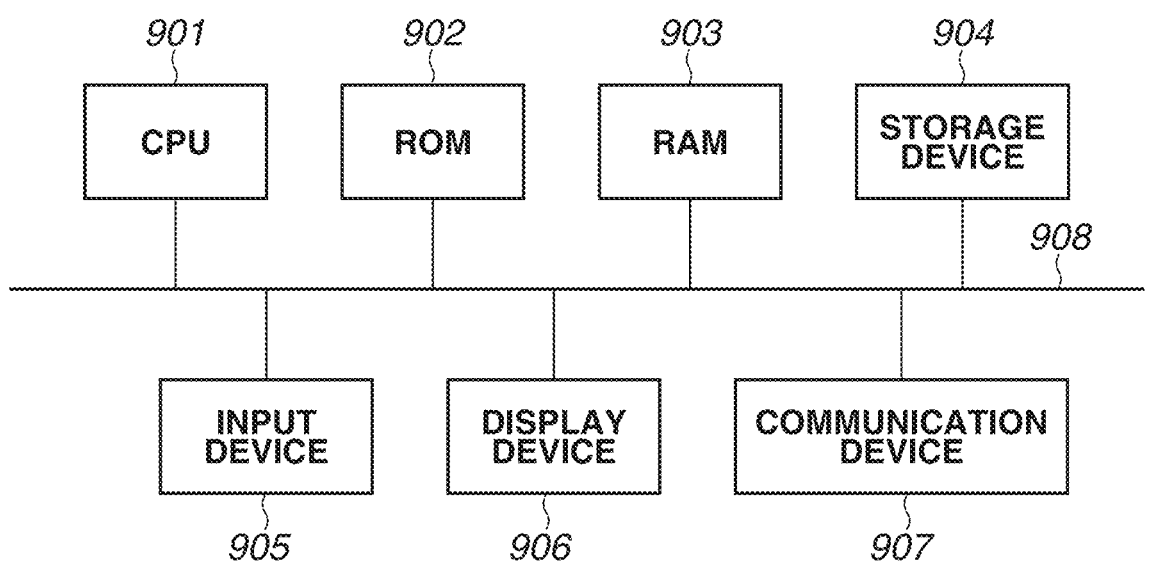
FIG. 9 is a diagram illustrating a configuration of an information processing apparatus according to a fourth exemplary embodiment.

FIG. 9 is a diagram illustrating a configuration of the image processing apparatus according to the fourth exemplary embodiment. The information processing apparatus can be implemented by a computer (information processing apparatus) connected to the substrate processing apparatus so as to be able to communicate with the substrate processing apparatus. In FIG. 9, a CPU 901 (processing unit) executes an operating system (OS) and various kinds of application programs. The CPU 901 is not limited to a CPU and may be a processor or a circuit, such as a micro processing unit (MPU), a graphics processing unit (GPU), and an application-specific integrated circuit (ASIC). The CPU 901 may be a combination of any of these processors or circuits.

A read-only memory (ROM) 902 is a memory that stores a program executed by the CPU 901 and fixed data out of parameters for calculation. A random-access memory (RAM) 903 is a memory that provides work space and space in which data is temporarily stored. The ROM 902 and the RAM 903 are connected to the CPU 901 via a bus 908.

An input device 905 (input unit) includes a mouse and a keyboard, and a display device 906 (display unit) is a cathode-ray tube (CRT) display, a liquid crystal display, or the like. The input device 905 and the display device 906 play a role as a user interface of the information processing apparatus. The input device 905 and the display device 906 may be a built-in device such as a touch panel. The input device 905 and the display device 906 may be configured as a device arranged separately from a computer.

A storage device 904 is a hard disk device, a compact disk (CD), a digital versatile disk (DVD), a memory card, or the like, and stores various kinds of programs, various kinds of data such as recipe data, and the like. The input device 905, the display device 906, and the storage device 904 are each connected to the bus 908 via an interface, which is not illustrated. A communication device 907 that is connected to the network to perform communication is also connected to the bus 908. The communication device 907 is used to perform data communication using a communication protocol, such as a Transmission Control Protocol/Internet Protocol (TCP/IP), by being connected to a local area network (LAN), and perform mutual communication with another communication device. The communication device 907 functions as a data transmission/reception unit, receives, for example, the information regarding the recipe data, the information regarding the layout data, and the like from a transmission unit (not illustrated) in the substrate processing apparatus, and stores the information in the storage device 904.

The information processing apparatus according to the present exemplary embodiment is arranged outside the substrate processing apparatus, and performs control to display, on the search screen, the information regarding the recipe data and the information regarding the layout data each acquired from the storage device 904 or the like, in association with each other. <Exemplary Embodiment of Manufacturing Method of Article>

A description is now provided about a manufacturing method of, for example, a device (a semiconductor device, a magnetic storage medium, a liquid crystal display element, or the like), a color filter, or a hard disk, as an article. The manufacturing method includes a step of forming a pattern on a substrate (a wafer, a glass plate, film-like substrate, or the like) using a pattern forming apparatus (for example, an exposure apparatus, an imprint apparatus, or a drawing apparatus). The manufacturing method further includes a step of processing the substrate on which the pattern has been formed. The processing step can include a step of removing a residual film of the pattern. The processing step can include another known step such as a step of etching the substrate using the pattern as a mask. The manufacturing method of the article according to the present exemplary embodiment is more advantageous than ever before in at least one of performance, quality, productivity, or production cost of the article.

While the preferred exemplary embodiments of the present invention have been described, it goes without saying that the present invention is not limited to these exemplary embodiments, and various modifications and changes can be made without departing from the gist of the present invention.

The exposure apparatus has been described as one example of the substrate processing apparatus, but the substrate processing apparatus is not limited the exposure apparatus. The substrate processing apparatus may be, for example, an imprint apparatus configured to bring an imprint material, which is supplied onto a substrate, into contact with a die (original plate, mold), apply energy for curing to the imprint material, and thereby form a composition to which a shape of the die is transferred. The substrate processing apparatus may be, for example, a drawing apparatus configured to perform drawing on a substrate with charged particle beams (electron beams, ion beams, or the like) via a charged particle beam optical system to form a pattern on the substrate. The substrate processing apparatus can include an apparatus configured to perform steps other than the steps performed by the exposure apparatus or the like as described above in manufacturing the article such as the device. The above-mentioned apparatus is, for example, an application apparatus configured to apply a photoconductive medium onto a surface of a substrate, and a developing apparatus configured to develop a substrate onto which a pattern is transferred. The substrate processing apparatus can include, for example, an apparatus configured to inspect a processed substrate, such as an overlay inspection apparatus, a line width inspection apparatus, a pattern inspection apparatus, and an electrical characteristics inspection apparatus.

The first to fourth exemplary embodiments can not only be implemented independently, but also be implemented in any combinations.

According to the present invention, the information processing apparatus capable of searching for the recipe data in a shorter period of time, the display control method, the storage medium, the substrate processing apparatus, and the manufacturing method of the article are provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-206834, filed Dec. 14, 2020, which is hereby incorporated by reference herein in its entirety.

What is claimed is:

1. An information processing apparatus configured to control display on a user interface, the information processing apparatus comprising;
    an acquisition unit configured to acquire recipe data regarding a processing condition of a substrate processing apparatus configured to process a substrate and layout data regarding a layout of a processed portion of the substrate processed by the substrate processing apparatus; and
    a display control unit configured to perform control to display, on the user interface, information regarding the layout data and information regarding the recipe data related to the layout data, the layout data and the recipe data being acquired by the acquisition unit, in association with each other.

2. The information processing apparatus according to claim 1, wherein the display control unit is configured to perform control to display, on the user interface, a layout image obtained by imaging information regarding the layout as the information regarding the layout data.

3. The information processing apparatus according to claim 1, wherein the display control unit is configured to control display, on the user interface, information regarding one piece of the layout data in association with information regarding a plurality pieces of the recipe data.

4. The information processing apparatus according to claim 1, wherein the display control unit is configured to control display, on the user interface, information regarding one piece of the recipe data in association with information regarding a plurality pieces of the layout data.

5. The information processing apparatus according to claim 4, wherein the display control unit is configured to, in a case of displaying part of the information regarding the plurality of pieces of the layout data on the user interface, perform control to display all of the information regarding the plurality of pieces of the layout data in accordance with an input from the user interface.

6. The information processing apparatus according to claim 1,
wherein the display control unit is configured to perform control to display, on the user interface, display to input a search condition based on the information regarding the recipe data and the information regarding the layout data, and
wherein the acquisition unit is configured to acquire the recipe data and the layout data each satisfying the search condition input from the user interface.

7. The information processing apparatus according to claim 1, wherein the display control unit is configured to display the information regarding the layout data and the information regarding the recipe data related to the layout data side by side, and thereby perform control to display, on the user interface, the information regarding the layout data and the information regarding the recipe data related to the layout data in association with each other.

8. The information processing apparatus according to claim 1, wherein the display control unit is configured to display a line connecting the information regarding the layout data and the information regarding the recipe data related to the layout data to each other, and thereby perform control to display, on the user interface, the information regarding the layout data and the information regarding the recipe data related to the layout data in association with each other.

9. The information processing apparatus according to claim 1, wherein the display control unit is configured to display the information regarding the layout data and the information regarding the recipe data related to the layout data using a related color, and thereby perform control to display, on the user interface, the information regarding the layout data and the information regarding the recipe data related to the layout data in association with each other.

10. A display control method of controlling display on a user interface, the display control method comprising:
acquiring recipe data regarding a processing condition of a substrate processing apparatus configured to process a substrate and layout data regarding a layout of a processed portion of the substrate processed by the substrate processing apparatus; and
performing display control to display, on the user interface, information regarding the acquired layout data and information regarding the acquired recipe data related to the layout data in association with each other.

11. A storage medium storing a program that causes a computer to execute a display control method of controlling display on a user interface, the display control method comprising:

acquiring recipe data regarding a processing condition of a substrate processing apparatus configured to process a substrate and layout data regarding a layout of a processed portion of the substrate processed by the substrate processing apparatus; and
performing display control to display, on the user interface, information regarding the acquired layout data and information regarding the acquired recipe data related to the layout data in association with each other.

12. A substrate processing apparatus configured to process a substrate, the substrate processing apparatus comprising:
an information processing apparatus configured to control display on a user interface,
wherein the information processing apparatus includes:
an acquisition unit configured to acquire recipe data regarding a processing condition of the substrate processing apparatus to process the substrate and layout data regarding a layout of a processed portion of the substrate processed by the substrate processing apparatus; and
a display control unit configured to perform control to display, on the user interface, information regarding the layout data and information regarding the recipe data related to the layout data, the layout data and the recipe data being acquired by the acquisition unit, in association with each other.

13. A manufacturing method of an article, the manufacturing method comprising:
processing a substrate using a substrate processing apparatus; and
manufacturing an article from the processed substrate,
wherein the substrate processing apparatus includes an information processing apparatus configured to control display on a user interface,
wherein the information processing apparatus includes:
an acquisition unit configured to acquire recipe data regarding a processing condition of the substrate processing apparatus to process the substrate and layout data regarding a layout of a processed portion of the substrate processed by the substrate processing apparatus; and
a display control unit configured to perform control to display, on the user interface, information regarding the layout data and information regarding the recipe data related to the layout data, the layout data and the recipe data being acquired by the acquisition unit, in association with each other.

\* \* \* \* \*